Dec. 17, 1940.     R. R. ANDERSON     2,225,244
TRAILER AND METHOD OF HEATING AND AIR CONDITIONING SAME
Filed March 27, 1939
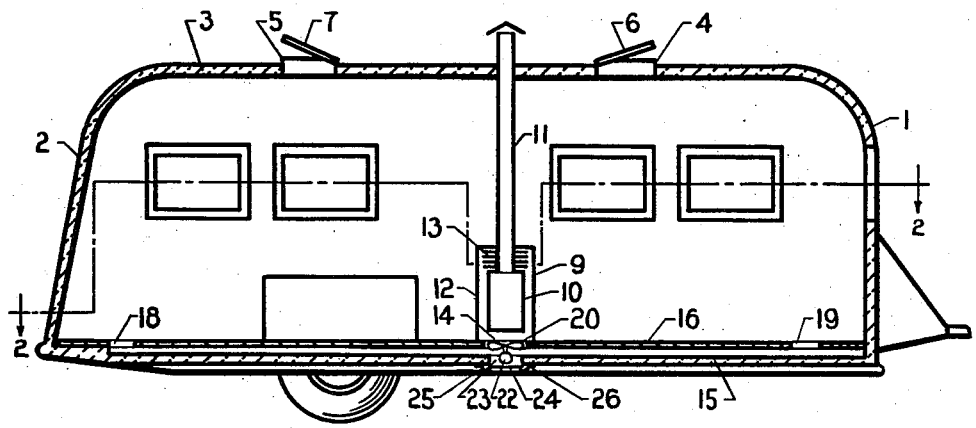
Fig-1
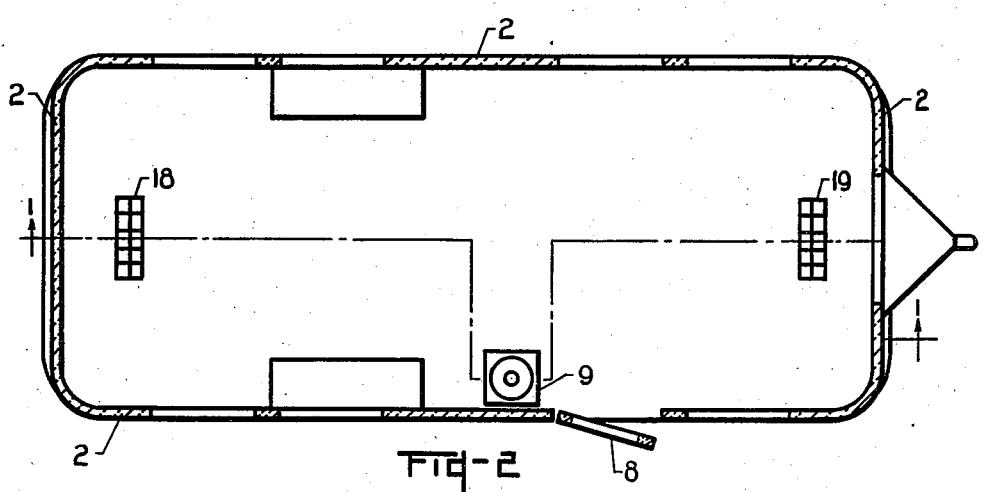
Fig-2
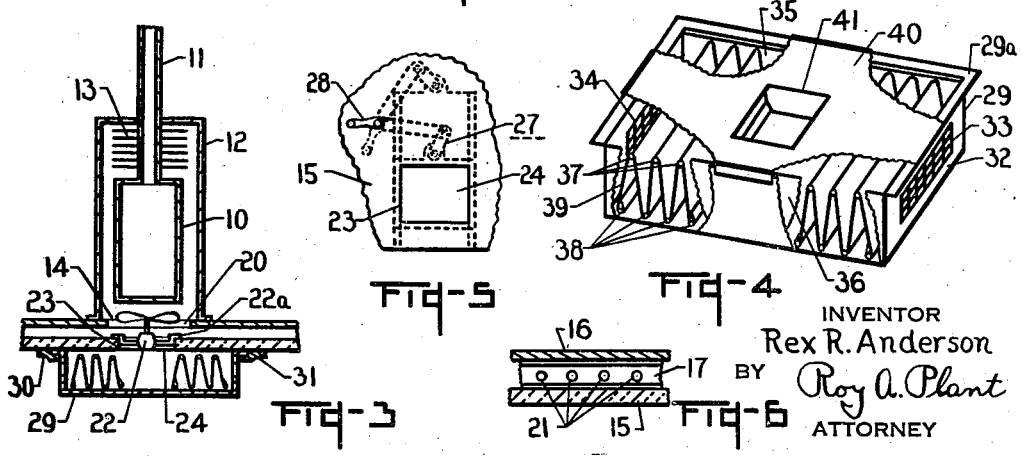
INVENTOR
Rex R. Anderson
BY Roy A. Plant
ATTORNEY

Patented Dec. 17, 1940

2,225,244

UNITED STATES PATENT OFFICE

2,225,244

TRAILER AND METHOD OF HEATING AND AIR CONDITIONING SAME

Rex R. Anderson, Marshall, Mich., assignor to Anderson Coach Co., Inc., Marshall, Mich., a corporation of Michigan Application March 27, 1939, Serial No. 264,467

13 Claims. (Cl. 237—69)

The present invention relates broadly to compartments with apparatus for treating the air therein, and in its specific phases it relates to a house trailer of special construction provided with insulation, an air circulating system, and means for treating the circulated air.

The house trailer or trailer coach is rapidly being adopted for year round living quarters during both warm and cold weather. Where it is used in this manner in cold weather with temperatures below freezing, two major defects are apparent in the trailer of today. The first of these is a cold floor, even when the temperature in the upper portion of the trailer may be as high as 90° F. With outdoor temperatures of 15° F., or lower, the floor is so cold that frost commonly forms in many places, and particularly at the ends of the trailer remote from the stove. It is common practice to construct trailer coaches with either a single long room, or else with partitions or the like to form two or more rooms. Under these conditions, the heating stove is placed in the living room portion of the trailer and the air heated by the stove slowly flows along the ceiling to the remote end or ends of the trailer and then back along the floor in very cold form to the stove, with resulting discomfort to the occupants. The second major defect involves sweating or condensation of moisture on the walls and floor of the trailer, particularly at those points most remote from the heating system. This condensation is accentuated in a closed trailer by the relatively high humidity resulting from cooking and the breath of the occupants. On hot summer days these same trailers are relatively hot and no means are provided for reducing the temperature in the trailer or removing dust and pollen from the air therein. The present invention has been devised with these fundamental shortcomings of the art in mind and with the idea of overcoming, or at least largely mitigating, the difficulties involved.

Accordingly, among the objects of the present invention is the provision of an insulated trailer body, or the like, with a double floor, the bottom floor being insulated and the top floor spaced therefrom to form an air passageway between floors.

Another object is to construct a trailer, or the like, so as to provide a warm floor even under low outdoor temperatures.

Another object is to provide a double floor trailer, or the like, having an air passageway between floors and a heating stove mounted above said floor and connected to said passageway so that air already heated in the trailer will be drawn through the passageway to warm the floor prior to the air being re-heated by the stove and delivered again to the interior of the trailer.

Another object is to provide means for forced circulation of air through the heater, trailer compartment, and from the remote ends of said compartment through a passageway between the double floor back to the heater.

A further object is to provide means for admitting a controlled amount of fresh air to the circulating system to replace a like quantity of humid air escaping through the ventilators or the like.

A further object is to provide the trailer air circulating system with an air cleaning and cooling apparatus adapted for use in the supplying of fresh outside air to the trailer compartment.

A still further object is to provide means for better circulation of air in the trailer compartment so that the temperature therein is relatively uniform throughout.

A still further object is to provide an improved method of heating house trailers and the like.

Still further objects and advantages of the invention will appear as the description proceeds.

To the accomplishment of the foregoing and related ends, the invention, then, consists of the methods and means hereinafter fully described and particularly pointed out in the claims, the annexed drawing and the following description setting forth in detail certain means and modes of carrying out the invention, such disclosed means and modes illustrating, however, but several of various ways in which the principle of the invention may be used.

In said annexed drawing:

Figure 1 shows a sectional elevation of a house trailer embodying in diagrammatic manner certain features of the present invention, as viewed along the line 1—1 of Figure 2.

Figure 2 is a sectional plan view of a house trailer embodying in diagrammatic manner certain features of the present invention, as viewed along the line 2—2 of Figure 1.

Figure 3 shows a portion of the trailer assembly of Figure 1 with an air conditioner attached thereto.

Figure 4 is an enlarged perspective view of a preferred form of the air conditioner with certain parts broken away to show the inner construction thereof.

Figure 5 shows one form of mechanism adapted for mounting under the heater for controlling the amount of fresh air admitted at that point to the interior of the trailer.

Figure 6 shows a section through the double floor and illustrates one form of spacing member for use between the floors.

For simplicity of understanding the present invention, it has been diagrammatically shown in connection with a house trailer devoid of interior fittings and equipment aside from the heater. Referring more particularly to the drawing, Figure 1 shows a house trailer 1 having insulated side and end walls 2, and an insulated roof 3. In conventional construction the roof is provided with ventilators 4 and 5 with adjustable hinged and insulated hatches 6 and 7. Ingress and egress from the trailer is had in conventional manner by means of door 8.

Due to the cold air which flows into the trailer when the door is opened in cold weather, it is common practice to mount the stove 9 at one side of the doorway. For simplicity of showing the present invention, this standard construction is illustrated, although it is to be understood that the invention is not limited to the placing of the stove in this specific location. There are many forms of stoves adaptable for use in trailers, and diagrammatically they may be shown as consisting of a firepot 10 in which the fuel is burned, a chimney 11 for carrying the products of combustion out of the trailer, and a housing 12. The upper end of the housing across the top and usually at one side is provided with vent openings 13 through which heated air passes into the trailer compartment as shown at an elevation preferably below mid-ceiling height. The delivery of heat directly to the interior of the trailer at the top of the stove rather than piping it to the ceiling before release presents the advantages of improving the general circulation of air within the trailer, reduces draft tendencies, and facilitates more even distribution of heat throughout the trailer interior, with resultant improvement in living conditions for house trailer residence. The inlet into the housing for air to be heated is normally in the side thereof near the floor. According to the present invention, this air inlet is closed and an inlet 14 is made in the bottom of the housing 12.

In the place of the conventional single floor used in house trailers, the present invention involves the use of a double floor, preferably of tight construction throughout as shown, which avoids short circuiting of air circulating within the trailer, and insures relatively uniform temperatures from end to end of the trailer compartment when the trailer is constructed as described. The lower floor 15 is provided with insulating material of any suitable type and preferably in sheet form. Sheet material of fibrous and cellular nature such as is obtainable on the market under the name of Celotex is well adapted for this purpose. Normally an inch thickness of this material on the bottom of the trailer is ample for the purpose at hand, although the invention is not limited to that specific thickness of insulation. Where the under face of the floor is exposed to the elements, it is preferable to cover the exposed face with asphaltic paint or other water resisting material. Mounted above the lower floor 15 is upper floor 16 of conventional tight construction which may be covered with linoleum, or the like if desired. The upper floor 16 is adjacent to but spaced from the lower floor 15 in conventional manner, for instance, by means of spacers 17 (Figure 6). These spacers 17 may be in the form of longitudinal or cross members supported by the trailer frame, or the trailer frame may constitute at least part of the spacing members between the floors. In any event, the spacers should be so laid or constructed that air can flow between the floors from the cold air registers, which occupy a relatively small portion of the floor, to the cold air inlet of the stove in manner warming a major portion, if not the whole area of the upper floor. In preferred construction the air passageway will underlie an area of the floor at least as large as the exposed surface of the upper floor. Where these spacers 17 are located so that they would normally block this air passage, they should be provided with suitable air passageways such as openings 21. These openings may be located in desired places in order to distribute the air-flow between floors in preferred manner to keep the exposed upper floor warm. The terms "air passageway," "shallow air passageway," "relatively wide but shallow air passageway," et cetera, are intended to cover the various forms of construction typically described herein, regardless of whether the passageway is divided into a plurality of air flow channels by means of supports for the upper floor panel, the frame, or otherwise. The upper floor 16 is provided adjacent the front and rear ends of the trailer with cold air registers 18 and 19 which communicate with the air space between upper floor 16 and lower floor 15. The upper floor 16 is also provided with an opening 20 under the stove 9 so as to cooperate with the cold air inlet 14 thereof. With the floor and stove constructed and assembled in this manner, the operation of the stove will cause a natural flow of air through the space between floors and out of the vent openings 13 of the stove, and thence back through the cold air registers 18 and 19 and passageway between floors to the stove again for re-circulation. This construction carries heat to the ends of the trailer compartment and warms the floor thereof, all of which aids in providing a more uniform temperature throughout the trailer and at the same time eliminates the undesirable flow of cold air on top of the floor to the heater. This construction also retards the condensation of water, as well as the formation of frost on the inner surfaces of the trailer compartment in cold weather.

To increase the efficiency of operation of the stove, as well as to make the temperature of the trailer compartment and floor still more uniform, an electric fan 22, preferably with a spider type supporting frame 22a or the like, may be mounted below the stove at the inlet 14 thereof, or at any other convenient point. The operation of this fan will draw air through cold air registers 18 and 19 from the trailer compartment, and after such air has traveled between the floors to the inlet 14 of the stove will force same through the space between firepot 10 and housing 12, and then out of vent openings 13 in the top of the stove into the trailer compartment. Operation in this manner causes the fan to aid the natural flow of heated air through the system. If, however, it is desired to have an extra warm floor, the fan may be operated in reverse direction so as to cause the heated air to flow between the floors and out of registers 18 and 19. The use of a reversible fan in this manner makes it possible for the user of the house trailer to decide which way he would like to have the air-flow take place. The rate of flow of air through the passageway will also vary with the shallowness thereof. In preferred construction this passageway will have a height varying between a half inch and the height of the frame, which normally will vary between three and five inches, although the invention is not limited thereto, as long as the passageway principle and desired rate of air-flow therein is retained.

The humidity of the air in the trailer compartment normally becomes rather high due to moisture given off during cooking and from other sources. At the same time, the air outside of the trailer in cold weather has a relatively low humidity. In order to reduce the humidity of the air in the trailer compartment with its condensation tendency, and also to freshen the air therein, it is desirable to replace part of the air in the trailer compartment with fresh outside air. To accomplish this, the lower floor 15 of the trailer may be provided with a passageway 23 (Figure 1) below fan 22. A damper which may be in the form of a slide 24 slidably carried on supports 25 and 26 is preferably mounted below passageway 23 so as to permit the closing or opening of same. Slide 24 may be manually operated from the outside of the trailer, or if desired it may be pivotally connected by means of a link 27 (Figure 5) to a pivoted handle member 28 so as to permit control of slide 24 from the inside of the trailer.

In the summer, it is frequently desirable to cool the air inside of the trailer compartment and incidentally to remove dust and pollen from the air for the relief of hay fever sufferers. This may be readily accomplished by providing a drawer-type air conditioner adapted to be slid under the trailer below electric fan 22 and supported by means of its flanged upper edge 29a on slide members 30 and 31 (Figure 3). As shown in Figure 4, the air conditioner 29 is provided with a housing 32 having air inlets 33 and 34 in the upper portion of each end thereof. The use of double inlets reduces the rate of flow of air through the cloth filter, and increases its efficiency, as well as the amount of air possible to handle. Removably mounted in said housing is a framework consisting of a pair of plate members 35 and 36 carrying at each end a series of upper cross-rods 37 and a series of lower cross-rods 38. A coarse woven strip of cloth 39, such as coarse mesh canvas, monk's cloth, or the like, is laced back and forth over rods 37 and 38 to form a filter through which air may be drawn. The upper face of the housing 32 may be closed, if desired, by means of a suitable cover 40 having a passageway 41 adapted to coincide with passageway 23 in bottom floor 15. This cover not only protects the cloth strips 39 when the unit is being installed or removed, but also aids in reducing by-pass leakage of air around said cloth strips. The air conditioner 29 would normally be removed while traveling to avoid injury thereto by accidental contact with the road bed or foreign objects, and would be slipped back in place when a point of stay was reached. To increase the efficiency of the air conditioner, it may be connected to the water over-flow from the ice box or water may be placed therein, either of which will cause the cloth 39 to become wet above the water level by wick action so as to aid in removing dust and pollen from the air and at the same time to cause the air drawn therethrough to be cooled due to the evaporation of the water. With the air conditioner 29 in place, its operation merely requires the opening of the passageway to the trailer compartment by suitable movement of slide 24 and the operation of fan 22. To increase the amount of air drawn through the air conditioner 29, the cold air registers 18 and 19 may be either closed or covered. The use of this type of air conditioner has the still further advantage of being simple to construct and easily cleanable, since the inner portion of the air conditioner with its cloth strips may be lifted out and cleaned with a hose or otherwise in a few minutes' time.

Other modes of applying the principle of my invention may be employed instead of those explained, change being made as regards the means and the methods herein disclosed, provided those stated by any of the following claims or their equivalent be employed.

I therefore particularly point out and distinctly claim as my invention:

1. In the method of heating and conditioning the air in a portable compartment having an externally exposed tight construction double floor with air passageway therebetween extending substantially full length of the floor and connected to the interior of the portable compartment by relatively widely spaced apart small inlet and outlet openings all of which are within said compartment and at least one of which is at one end thereof, said passageway underlying a major portion of the floor area, the steps which comprise withdrawing air from the interior of said compartment at an elevation below mid-ceiling height thereof, passing said withdrawn air through said passageway in said double floor from inlet to outlet thereof to substantially uniformly warm the exposed upper face of same above said passageway, returning said air flowing through said passageway to the interior of said compartment at an elevation below mid-ceiling height thereof, and supplying heat to said circulating air at a point above said floor, whereby the temperature and circulation of air within the compartment is caused to be relatively uniform throughout.

2. In the method of heating and conditioning the air in a portable compartment having an externally exposed tight construction double floor with air passageway therebetween extending substantially full length of the floor and connected to the interior of the portable compartment by relatively widely spaced apart small inlet and outlet openings all of which are within said compartment and at least one of which is at one end thereof, said passageway underlying a major portion of the floor area, the steps which comprise withdrawing air from the interior of said compartment at an elevation below mid-ceiling height thereof, passing said withdrawn air through said passageway in said double floor from inlet to outlet thereof to substantially uniformly warm the exposed upper face of same above said passageway, returning said air flowing through said passageway to the interior of said compartment at an elevation below mid-ceiling height thereof, supplying heat to said recirculating air at a point above said floor, admitting some fresh air to the air recirculating through said compartment and shallow passageway, and discharging from said recirculating air an amount thereof corresponding approximately with the amount of fresh air admitted thereto, whereby the recirculating air is freshened, the floor over the passageway warmed, and the temperature within the compartment is caused to be relatively uniform throughout.

3. In the method of heating and conditioning the air in a house trailer or the like having an externally exposed tight construction double floor with an air passageway therebetween extending substantially full length of the floor with relatively small inlets thereinto at the ends of the trailer and an outlet intermediate thereof, said passageway underlying a major portion of the floor area and substantially all of the exposed upper face thereof, the steps which comprise delivering heat inside the house trailer to the air contained therein, circulating said heated air through the interior of the trailer to the ends thereof, withdrawing the circulating air from the interior of said trailer at the ends thereof, passing said withdrawn air directly into and through the passageway between said double floor to warm the upper face of the latter, and delivering the air from said passageway through said outlet intermediate the ends of said house trailer into the interior thereof through the point of delivery of heat thereto, whereby the temperature within the house trailer remains relatively uniform throughout and flow of excessively cold air over the top of the floor from the ends of the trailer to the point of delivery of heat thereto is avoided.

4. The method of heating the interior of a portable compartment having an externally exposed floor, which comprises circulating air throughout said compartment, supplying heat to said air solely within said compartment, continuously withdrawing said heated air from said compartment into a space between the top and bottom faces of said floor, circulating said heated air at relatively uniform but gradually decreasing temperature from inlet to outlet through said space and over a horizontal area thereof at least substantially equal to the area of the exposed upper face of said floor to warm same relatively uniformly throughout, and then delivering said air from said space into said compartment for reheating therein, said recirculating air being delivered to and removed from said compartment below mid-ceiling elevation to facilitate relatively uniform heating of the interior of said compartment.

5. The method of heating the interior of a compartment having a floor which is externally insulated and exposed, said floor having tight construction top and bottom panels spaced apart to form a shallow air passageway therebetween substantially coextensive with said floor, an air heating means above said floor and within said compartment, the bottom portion of said compartment being connected to said passageway through relatively small and widely spaced apart openings, which comprises the steps of generating heat with said air heating means within said compartment and heating air therewith, recirculating said heated air under forced flow through a closed circuit including said compartment interior, floor passageway, and air heating means, and in carrying on said recirculation of air, removing the latter from as well as redelivering it to said compartment at an elevation below mid-ceiling height thereof to produce relatively uniform temperatures throughout the interior thereof.

6. A house trailer or the like which has insulated side and end walls, an insulated roof, an externally exposed double floor, the top and bottom portions of which are of tight construction throughout with a relatively shallow air passageway therebetween having a relatively large area in the plane of the floor at least approximately as large as the exposed surface of the top portion of the floor, insulation on the bottom portion of the floor, registers at the ends of said trailer in the top portion of the floor with an open passageway through each register for joining the interior of said trailer with said passageway in the double floor, a heating stove in said trailer, said heating stove having an air heating space, and means connecting said stove to the passageway between the top and bottom portions of said double floor, said connecting means having an opening between said passageway and the heating space of said stove, the registers, passageway in the floor, stove, and trailer interior being assembled in manner such that air heated by said stove will flow directly into the space inside the trailer, circulate to the registers at the ends of the floor, and then flow therethrough into said passageway in the double floor and back to said stove for reheating and re-circulation, whereby circulation of air completely to the ends of the trailer is attained without short circuiting, and the floor over the passageway is warmed relatively uniformly throughout.

7. A portable compartment having an externally exposed double floor, the top and bottom portions of which are of tight construction throughout with a relatively wide but shallow air passageway therebetween extending substantially full length of the floor, a heater within said compartment, means connecting the passageway in the double floor to said heater for flow of air therethrough, means located in said shallow passageway for distributing the air flowing therethrough, said distribution of air facilitating the heating of the floor above said passageway to a relatively uniform temperature throughout, and registers at both ends of said compartment for directly connecting the interior thereof at an elevation below mid-ceiling height to said shallow air passageway, said registers being relatively small and adapted to act as either inlets or outlets for air circulating through said passageway, compartment, and heater.

8. A house trailer or the like which has insulated side and end walls, an insulated roof, an externally exposed double floor, the top and bottom portions of which are of tight construction throughout with a relatively shallow air passageway therebetween having a relatively large area in the plane of the floor and at least substantially as large as the exposed surface of the top portion of the floor, insulation on the bottom portion of the floor, open construction registers at the ends of said trailer in the top portion of the double floor for joining the interior thereof with said passageway in the double floor, a heating stove in said trailer, said heating stove being adapted to deliver heat directly from the upper end thereof into the trailer compartment, means connecting said stove to the passageway between the top and bottom portions of said double floor for flow of air from said passageway through said stove into the space inside the trailer, said air then circulating to the registers at the ends of the floor, and thence into said passageway in the double floor and back therethrough to said stove for re-heating and re-circulation, and adjustable means connecting said passageway to the atmosphere outside of said trailer intermediate of the ends of said passageway, and substantially adjacent the point of connecting the stove thereto, for admitting some fresh air to the re-circulating air within the trailer and shallow air passageway, whereby circulation of air within the trailer from the stove to the cold air inlets at the ends of said trailer is attained, the circulating air freshened, and the floor over the passageway warmed.

9. A house trailer or the like which has insulated side and end walls, an insulated roof, an externally exposed double floor, the top and bottom portions of which are of tight construction throughout with a relatively shallow air passageway therebetween having a relatively large area in the plane of the floor at least approximately as large as the exposed surface of the top portion of the floor, insulation on the bottom portion of the floor, open passage moderate size registers at the ends of said trailer directly joining the interior thereof with said passageway in the double floor, a heating stove in said trailer, said heating stove being adapted to deliver heat directly from the upper end thereof into the trailer compartment at relatively low elevation, means connecting said stove to the passageway between the top and bottom portions of said double floor for flow of air from said passageway through said stove into the space inside the trailer, said air then circulating to the registers at the ends of the floor, and thence into said passageway in the double floor and back to said stove for re-heating and re-circulation, an electric fan for forcing circulation of said air, adjustable means connecting said passageway to the atmosphere outside of said trailer intermediate of the ends of said passageway, and substantially adjacent the point of connecting the stove thereto, for admitting some fresh air to the re-circulating air within the trailer and shallow air passageway, and an air conditioning means connected for cooperation with said adjustable means for treating the fresh air passing into said passageway through the agency of said adjustable means, whereby circulation of air within the trailer to the moderate size registers thereof is attained, the circulating air freshened, and the floor over the passageway warmed.

10. A portable compartment having an externally exposed double floor, the top and bottom portions of which are of tight construction throughout with a relatively wide but shallow air passageway therebetween extending substantially full length of said compartment, heat insulating material on the bottom portion of said floor, inlet and outlet connection means through the top portion of said double floor within said compartment and adapted to connect the interior of said compartment with said passageway at the ends of said compartment and also at a point intermediate thereof, said connections forming part of the circuit for the continuous recirculation of air through said compartment and passageway, all points of ingress and egress of air circulating through said compartment and shallow passageway in series in either direction being below mid-ceiling height of the former, said connections at the ends of said compartment being of moderately small size and adapted to directly connect said passageway with the interior of the compartment and means at said intermediate connection to said passageway for connecting the latter to the interior of said compartment.

11. A portable compartment having an externally exposed double floor, the top and bottom portions of which are of tight construction throughout with a relatively wide but shallow air passageway therebetween extending substantially full length of the floor, a heater within said compartment, said heater opening at its upper end into said compartment substantially below mid-ceiling height of the latter, means connecting the passageway in the double floor to said heater at its lower end, said connecting means having an opening therethrough to permit flow of air through said passageway and heater in series, and a connecting means in the top portion of said floor within said compartment and at both ends thereof, said last-named connecting means having an opening therethrough for connecting the interior of said compartment to said shallow air passageway in manner permitting flow of air through said passageway in the double floor between said connecting means in the floor at the ends of the compartment and said connecting means for said heater, said connecting means at the ends of the compartment being relatively small and adapted to satisfactorily act as either inlet or outlet for air passing through said passageway.

12. A portable compartment having an externally exposed double floor, the top and bottom portions of which are of tight construction throughout with a relatively wide but shallow air passageway therebetween extending substantially full length of the floor, a heater within said compartment, said heater opening at its upper end into said compartment substantially below mid-ceiling height of the latter, means connecting the passageway in the double floor to said heater at its lower end, said connecting means having an opening therethrough to permit flow of air through said passageway and heater in series, a connecting means in the top portion of said floor within said compartment and at both ends thereof, said last named connecting means having an opening therethrough for connecting the interior of said compartment below its mid-ceiling height to said shallow air passageway in manner permitting flow of air through said passageway in the double floor between said connecting means in the floor at the ends of the compartment and said connecting means for said heater in either direction, said connecting means at the ends of the compartment being relatively small and adapted to satisfactorily act as either inlet or outlet for air passing through said passageway, and an electric fan for forced circulation of air in predetermined direction through said circuit including said compartment, passageway, and heater.

13. A portable compartment having an externally exposed double floor, the top and bottom portions of which are of tight construction throughout with a relatively wide but shallow air passageway therebetween extending substantially full length of the floor, a heater within said compartment, said heater opening at its upper end into said compartment substantially below mid-ceiling height of the latter, means connecting the passageway in the double floor to said heater at its lower end, said connecting means having an opening therethrough to permit flow of air through said passageway and heater in series, a connecting means in the top portion of said floor within said compartment and at both ends thereof, said last named connecting means having an opening therethrough for connecting the interior of said compartment below its mid-ceiling height to said shallow air passageway in manner permitting flow of air through said passageway in the double floor between said connecting means in the floor at the ends of the compartment and said connecting means for said heater in either direction, said connecting means at the ends of the compartment being relatively small and adapted to satisfactorily act as either inlet or outlet for air passing through said passageway, and adjustable means connecting said passageway to the atmosphere outside of said compartment intermediate of the ends of said passageway, and substantially adjacent the point of connecting the heater thereto, for admitting some fresh air to the recirculating air within the compartment and shallow air passageway, whereby circulation of air within the compartment from the heater to the connecting means at the ends of said compartment is attained, the circulating air freshened, and the floor over the passageway warmed.

REX R. ANDERSON.